United States Patent [19]
Ayyildiz et al.

[11] Patent Number: 5,443,146
[45] Date of Patent: Aug. 22, 1995

[54] IMPACT-ABSORBING SHOCK ABSORBER WITH DEFORMATION BODY

[75] Inventors: Metin Ayyildiz, Köln; Holger Kirchner, Ruppichteroth, both of Germany

[73] Assignee: Fichtel & Sachs AG, Eitorf, Germany

[21] Appl. No.: 285,481

[22] Filed: Aug. 3, 1994

[30] Foreign Application Priority Data

Aug. 4, 1993 [DE] Germany ............. 43 26 070.5
Feb. 2, 1994 [DE] Germany ............. 44 03 127.0

[51] Int. Cl.⁶ .................................................. F16F 7/12
[52] U.S. Cl. .................................... 188/374; 188/371; 188/322.11
[58] Field of Search ............ 188/268, 317, 321.11, 188/322.11, 371, 374, 376; 267/64.15, 64.26; 293/133, 134

[56] References Cited

U.S. PATENT DOCUMENTS

| | | | |
|---|---|---|---|
| 3,993,294 | 11/1976 | Wossner et al. .............. | 267/64.15 |
| 4,003,454 | 1/1977 | Wossner et al. .............. | 293/134 |
| 4,022,451 | 5/1977 | Voigt ......................... | 293/134 |
| 4,915,363 | 4/1990 | Prozeller et al. ............. | 267/64.15 |
| 4,988,081 | 1/1991 | Dohrmann .................... | 188/371 |
| 5,064,030 | 11/1991 | Wossner ...................... | 267/64.26 |
| 5,181,589 | 1/1993 | Siegner et al. ............... | 188/374 |

FOREIGN PATENT DOCUMENTS

| | | |
|---|---|---|
| 0473955 | 3/1992 | European Pat. Off. . |
| 2404706 | 8/1975 | Germany . |
| 3419165 | 11/1985 | Germany . |

*Primary Examiner*—Robert J. Oberleitner
*Assistant Examiner*—Chris Schwartz
*Attorney, Agent, or Firm*—Nils H. Ljungman & Associates

[57] ABSTRACT

An impact-absorbing shock absorber with two telescoping tubes, in particular for motor vehicles, for decelerating, as a result of hydraulic damping forces and pneumatic spring forces, a vehicle which collides with an obstacle, has an inner tube closed by a bottom, a gas chamber adjacent to the bottom and containing a gas cushion at high pressure, a separating piston guided in a sealed manner so that it can move inside the inner tube, a first fluid chamber, a partition which has throttle openings, and a second fluid chamber which is connected via the throttle openings of the partition to the first fluid chamber. Above a defined energy absorption threshold, the partition is can be displaced from its original installed position toward the gas chamber, with an accompanying change in the shape of the inner tube.

20 Claims, 2 Drawing Sheets

IMPACT-ABSORBING SHOCK ABSORBER WITH DEFORMATION BODY

BACKGROUND OF THE INVENTION

1. Field of the Invention

This invention generally relates to an impact-absorbing shock absorber with two telescoping tubes, in particular for motor vehicles, to decelerate the vehicle by hydraulic damping forces and pneumatic spring forces when the vehicle collides with an obstacle. Such an impact absorber can typically have an inner tube closed by a bottom, a gas chamber adjacent to the bottom and containing a gas cushion at high pressure, a separating piston guided so that it slides in a sealed manner inside the inner tube, a first fluid chamber, a partition fastened in the inner tube and provided with throttle openings, and a second fluid chamber which is connected by means of the partition to the first fluid chamber.

2. Background Information

German Patent No. 24 04 706 discloses a hydropneumatic impact-absorbing shock absorber in which an inner tube can be pushed into an outer tube in the event of a collision. The inner tube has a gas chamber which contains a gas cushion, which gas chamber is separated by a separating piston from a first fluid chamber. The first fluid chamber is in turn delimited on the end of the inner tube by a partition which has a throttle hole. In this manner, a connection can be formed between the first fluid chamber in the inner tube and a second fluid chamber which is formed by the outer tube. The impact-absorbing shock absorber has connection elements on the inner tube and on the outer tube for connecting the inner tube and outer tube relative to one another on respective ones of the vehicle body and a bumper.

In the event of a collision, the inner tube is pushed into the outer tube, and thereby displaces damping fluid out of the second fluid chamber, through the throttle opening of the partition, and into the first fluid chamber in the inner tube. During this process, a damping force is generated. The increase in the volume of the first fluid chamber is compensated by the movement of the separating piston. A purely hydraulic damping occurs, but it is only suitable for absorbing forces generated during collision at speed of up to about 4–8 kilometers per hour (km/h). Above this energy absorption threshold, the bumper or the body parts connected to the impact-absorbing shock absorber can be permanently deformed.

German Patent No. 34 19 165, which corresponds to U.S. Pat. No. 4,641,872, discloses an impact-absorbing shock Absorber which, in addition to a hydraulic damping, has a deformation shock absorber in the form of a folding tube. As soon as the energy absorption threshold for the hydraulic damping is exceeded, there is a deformation of the deformation tube up to an energy absorption threshold of approximately 15 km/h. But this arrangement has a serious disadvantage, since after a collision, as a result of a deformation of the folding tube, there can be a permanent change, or shortening, in the length of the impact-absorbing shock absorber. Moreover, an impact-absorbing bumper of this type has the disadvantage that all the large components, i.e. the first fluid chamber, the second fluid chamber and the gas chamber, are arranged in a row, and are, in turn, axially disposed adjacent to the space for the deformation tube.

Precisely the same disadvantages are essentially exhibited by the impact-absorbing bumper which is disclosed in European Patent Application EP-A 0 473 955. In this known impact-absorbing shock absorber, a deformation piston is pushed inside a deformation tube, whereby the deformation piston is connected to the hydraulic damping apparatus by means of a piston rod. In addition to the above-mentioned disadvantages, the interposition of a piston rod between the hydraulic damping apparatus and the deformation piston has the disadvantage that the piston rod has elasticities, so that the damping force has a maximum as a function of the distance, which is difficult to determine. In other words, it is generally impossible to rule out the possibility that the vehicle body will begin to deform before the beginning of the deformation of the deformation body on the impact-absorbing shock absorber.

OBJECT OF THE INVENTION

The object of the present invention is to eliminate the above-discussed disadvantages of known impact absorbers, using extremely simple means, and with the additional object of providing the most compact construction possible.

SUMMARY OF THE INVENTION

The present invention teaches that this object can be accomplished by means of an impact absorber wherein, above a defined energy absorption threshold, the partition can be displaced from its original installed position toward the gas chamber, with an accompanying change in the shape of the inner tube.

The inner tube thereby advantageously has an additional function, in that it simultaneously represents the deformation tube for the impact-absorbing shock absorber. Consequently, there is a savings in the amount of space required, which savings in space directly corresponds to a savings in the length of the deformation tube, as well as to a reduction in weight on account of the elimination of a separate deformation tube. An additional advantage is that the impact energy can be transmitted to the inner tube substantially directly, i.e. as a result of the elimination of a piston rod or similar device, so that the damping energy can essentially exactly equal the deformation energy.

An additional advantage provided by the present invention is that the partition can be configured with at least two guide segments which can be separated by a deformation segment. The partition can thereby be prevented from assuming a skewed position, which would result in an uncontrolled deformation of the inner tube. The deformation segment of the partition advantageously has a conical contour. Starting from the rest position, the deformation energy increases continuously, and continues to do so over the entire deformation length of the inner tube. There are no pronounced deformation peaks, which must generally be avoided.

In an additional advantageous feature of the present invention, the energy absorption threshold can optionally be determined by variations of at least one of the following: the cone angle of the deformation segment; the difference in the diameter of the two guide segments; and/or by means of the wall thickness of the inner tube. Thus, there can be a great deal of room for flexibility in the design of an impact-absorbing shock absorber, which flexibility in design can preferably make it possible to individually adapt the impact-absorbing shock absorber to the amount of space available or to the type of vehicle.

The inner tube can also preferably have a design deformation region which can preferably be made at least partly of aluminum. The use of aluminum, in addition to the lighter weight advantage, also can essentially guarantee that no deformation peaks will occur which result from the beginning of the deformation of the inner tube. The transition between the decrease in energy caused by the hydraulic damping and the subsequent energy decrease caused by the plastic deformation can thereby occur more "softly".

The present invention teaches that the maximum deformation distance can thus advantageously be determined by the distance between the end of the inner tube and the closure of the outer tube, or, in other words, the distance between the initial position of the partition, and the gasket which seals the inner tube to the outer tube.

An additional advantageous feature of the present invention is that the partition, after it has survived a collision, can essentially be pushed back into its original position as a result of the high pressure in the gas chamber. The overall length of the impact-absorbing bumper therefore can preferably remain constant after a collision, and thus, there will preferably be no visible damage to the vehicle.

One advantage of this arrangement is that the partition, after it has survived a collision, can be pushed back into its original position as a result of the high pressure in the gas chamber.

In summary, one aspect of the invention resides broadly in an impact damper for being connected between a frame and a bumper of a motor vehicle to dampen the impact of a collision of the motor vehicle with an obstacle, the impact damper comprising: an outer tubular member for being attached to one of: the frame of a motor vehicle, and the bumper of a motor vehicle; the outer tubular member having a first end and a second end; the outer tubular member comprising a first chamber disposed adjacent the second end of the outer tubular member, the first chamber comprising a hydraulic fluid therein; an inner tubular member for being attached to the other of: the frame of a motor vehicle, and the bumper of a motor vehicle; the inner tubular member being at least partially disposed within the outer tubular member through the first end of the outer tubular member, the inner tubular member being axially movable within the outer tubular member; the inner tubular member defining a longitudinal axis and the inner tubular member having a first end disposed towards the second end of the outer tubular member, a second end opposite the first end, and at least a portion of the inner tubular member defining a first dimension, the first dimension being substantially transverse to the longitudinal axis; the inner tubular member comprising: a second chamber disposed adjacent the second end of the inner tubular member, the second chamber comprising a reversibly compressible substance therein; a third chamber disposed adjacent the second chamber; piston apparatus disposed between and separating the second chamber from the third chamber; separating apparatus disposed adjacent the at least a portion of the inner tubular member for separating the first chamber from the third chamber, the separating apparatus having an opening therethrough for passage of fluid between the first and third chambers, the opening comprising damping apparatus for damping passage of fluid therethrough, the separating apparatus having a second dimension disposed substantially parallel to the first dimension of the at least a portion of the inner tubular member, the second dimension being greater than the first dimension; apparatus for retaining the separating apparatus in an initial position between the at least a portion of the inner tubular member and the first chamber; the separating apparatus being configured for moving along the expanded portion of the inner tubular member under a force applied to the separating apparatus by the fluid in the first chamber to absorb impact energy of a collision; and the separating apparatus comprising apparatus for expanding the at least a portion of the inner tubular member during movement along the at least a portion of the inner tubular member, the apparatus for expanding comprising apparatus for increasing the at least a portion of the inner tubular member to substantially the second dimension.

Another aspect of the invention resides broadly in an impact damper for being connected between a frame and a bumper of a motor vehicle to dampen the impact of a collision of the motor vehicle with an obstacle, the impact damper comprising: an outer tubular member; apparatus for operatively attaching the outer tubular member to one of: the frame of a motor vehicle, and the bumper of a motor vehicle; the outer tubular member having a first end and a second end; the outer tubular member comprising a first chamber disposed adjacent the second end of the outer tubular member, the first chamber comprising a hydraulic fluid therein; an inner tubular member; the inner tubular member comprising apparatus for operatively attaching the inner tubular member to the other of: the frame of a motor vehicle, and the bumper of a motor vehicle; the inner tubular member being at least partially disposed within the outer tubular member through the first end of the outer tubular member, the inner tubular member being axially movable within the outer tubular member; the inner tubular member having a longitudinal axis, a first end disposed towards the second end of the outer tubular member, a second end opposite the first end, and at least a portion of the inner tubular member defining a first dimension, the first dimension being disposed substantially transverse to the longitudinal axis; the inner tubular member comprising: second chamber apparatus disposed adjacent the second end of the inner tubular member; separating apparatus disposed adjacent the at least a portion of the inner tubular member for separating the first chamber from the second chamber apparatus, the separating apparatus having a second dimension, the second dimension being disposed substantially parallel with the first dimension of the at least a portion of the inner tubular member, the second dimension being greater than the first dimension; apparatus for retaining the separating apparatus in an initial position between the at least a portion of the inner tubular member and the first chamber; the separating apparatus being configured for moving along the at least a portion of the inner tubular member under a force applied to the separating apparatus by the fluid in the first chamber; and the separating apparatus comprising apparatus for expanding the at least a portion of the inner tubular member during movement along the at least a portion of the inner tubular member, the apparatus for expanding comprising apparatus for increasing the at least a portion of the inner tubular member to substantially the second dimension.

BRIEF DESCRIPTION OF THE DRAWINGS

The invention and its advantages are explained in greater detail herebelow with reference to the accompanying figures, in which.

DESCRIPTION OF THE PREFERRED EMBODIMENTS

Figure 1:
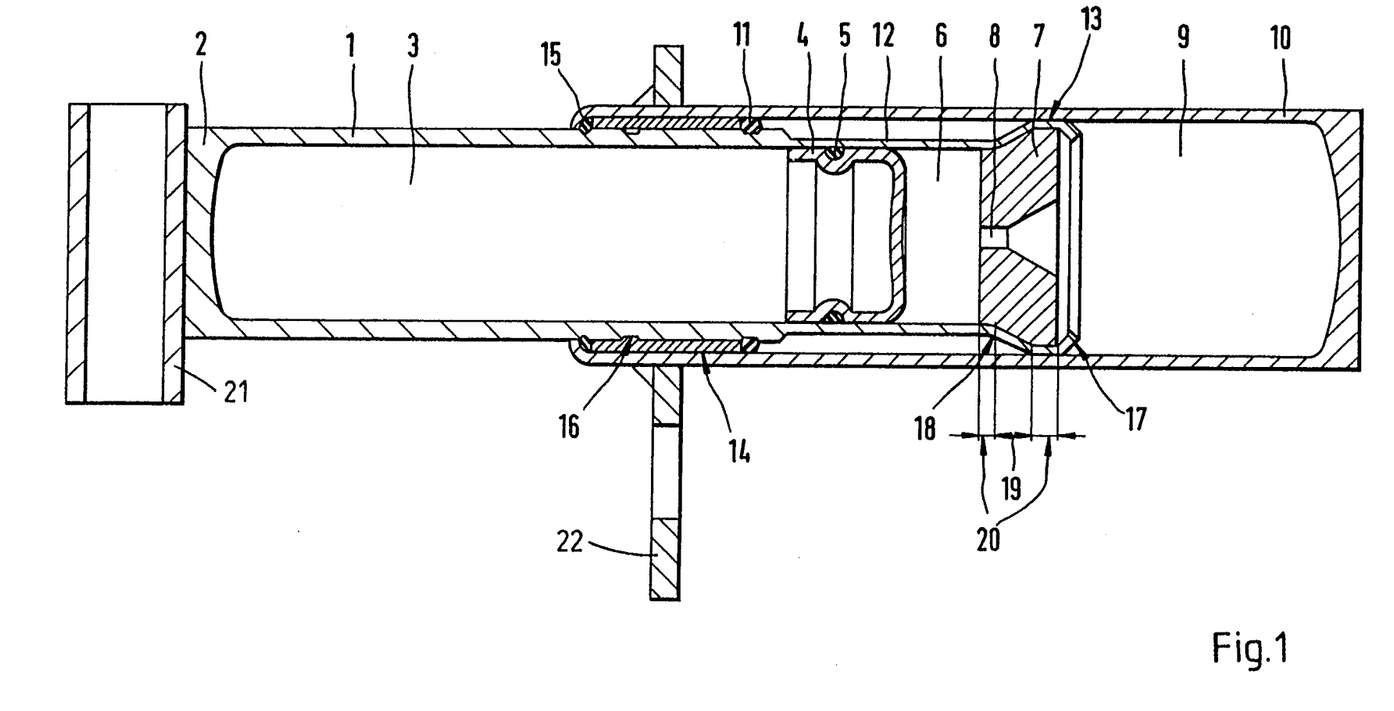
FIG. 1 shows a longitudinal section through an impact absorber in a pre-collision configuration.

The impact-absorbing bumper mount illustrated in FIG. 1 can be connected directly to the vehicle body by means of the component, or fastening member 22, that is fastened to the cylinder. In addition, the connecting piece 21, attached to the end 2 of the piston rod, or inner tube 1, can be fastened to the bumper. Alternatively, other types of fastening arrangements could be conceivable which would be well within the skill of the artisan. With such a configuration, each bumper could preferably be connected to the vehicle body by means of two, or more such impact-absorbing shock absorbers, which could be spaced apart from one another along the length of the bumper.

If the vehicle provided with such bumper mounts were to collide with an obstacle lightly, i.e. at relatively low impact speeds, the energy of the impact could be absorbed by the impact-absorbing shock absorbers and damage to the vehicle could essentially be prevented, or at least substantially minimized. Depending on the configuration of the components, as discussed below, such impact speeds could possibly be at speeds up to about 15 km/h. Alternatively, such impact speeds could be even higher at about 16 km/hr, 17 km/hr, 18 km/hr, 19 km/hr or 20 km/hr in at least some additional embodiments of the present invention.

The impact-absorbing shock absorber unit itself can have an outer tube 10, which can preferably have a device 22 for fastening the impact-absorbing shock absorber to the vehicle body. The inner tube 1 can telescope into the outer tube 10, whereby the inner tube 1 can slide, by means of the larger-diameter segment 13 and the seal arrangement formed by the guide ring 14, the contact ring 15 and the gasket 11, along the inner surface of the outer tube 10. By means of a bead 16 realized in a groove of the inner tube, the guide ring 14, which can preferably be designed in one piece, can be fastened on the inner tube 1 in the axial direction. In the cavity of the inner tube 1, a separating piston 4, with a sealing gasket 5 disposed therearound, separates the gas chamber 3, which can preferably be filled with a charge of compressed gas, from the first fluid chamber 6. This first, or work chamber 6 can preferably be in communication with a second fluid chamber 9 by means of a throttle opening 8 in a partition 7, which partition 7 and throttle opening 8 preferably act as a damping device. The partition 7, in the vicinity of the extension 13, can preferably be in contact with the inner surface of the inner tube 1 and can be maintained in place by means of a beading 17a (see FIG. 2) of the end 17. The chambers 6 and 9 are preferably filled with fluid and are essentially under the pressure exerted by the chamber 3, preferably filled with compressed gas, by means of the separating piston 4.

Instead of the described damping device, which essentially is formed by the opening 8 in the partition 7, additional damping valves could also be provided, as could an arrangement which has only damping valves. Such damping valves are generally well known, and are therefore not discussed in any greater detail herein.

Figure 2:
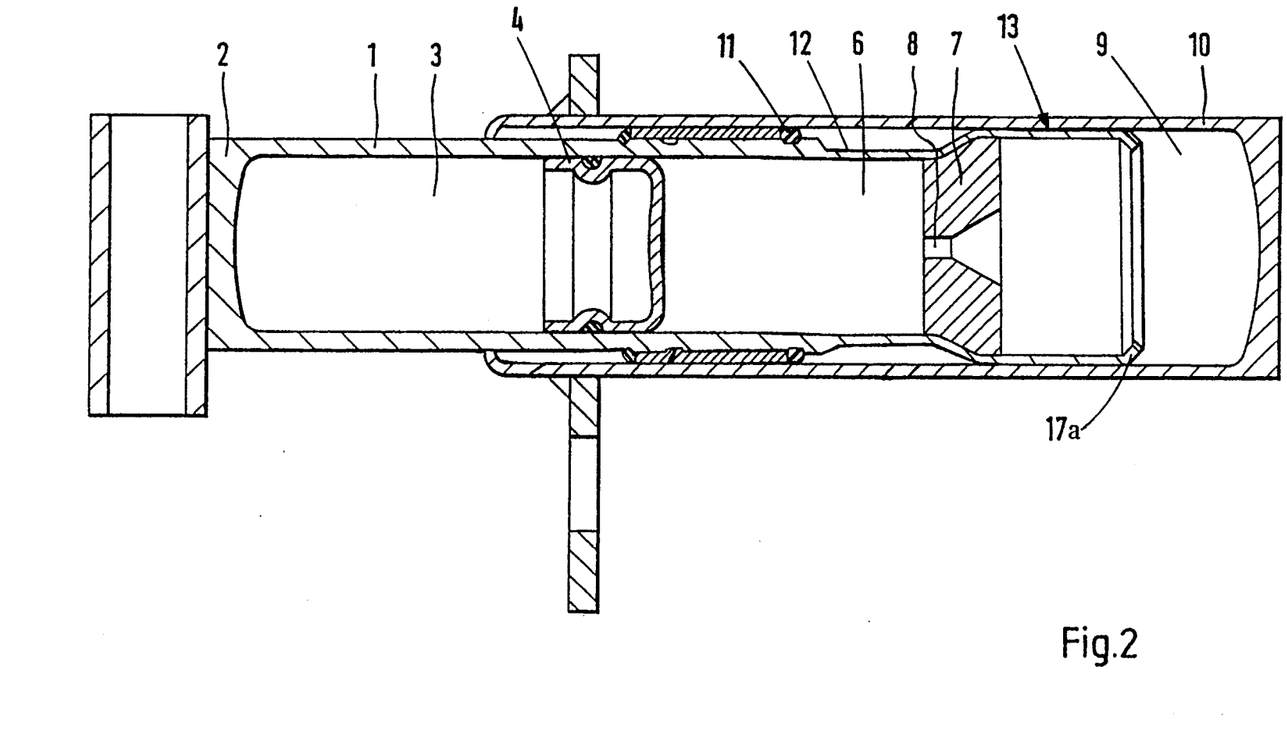
FIG. 2 depicts the impact absorber of FIG. 1 in a collision condition.

If a vehicle which is equipped with such hydropneumatic impact-absorbing shock absorbers collides with an obstacle, the inner tube 1 would generally be pushed into the cylinder 10. Fluid would thereby be displaced from the second fluid chamber 9, in the outer tube 10, via the throttle opening 8 of the partition 7, which acts as a damping device, and into the first fluid chamber 6 of the inner tube 1. This fluid pressurized by the damping device in the partition 7 causes an increase in the volume of the chamber 6 and thus an axial displacement of the separating piston 4 within the inner tube 1, whereupon the volume of the chamber 3, preferably filled with compressed gas, is reduced, and thus the pressure in the chamber 3 is increased.

The reaction force of the hydropneumatic impact-absorbing Shock absorber thus is produced by the damping force resulting from the damping device and the pneumatic spring force resulting from the increase in the pressure in the chamber 3. The above description regarding the functioning of the impact absorber essentially relates to a collision occurring at speeds, or absorption thresholds, of up to from about 4 km/h to about 8 km/h.

Above this defined absorption threshold, that is, collisions which occur at speeds greater than about 4 km/hr to about 8 km/hr, the partition 7 is movable on account of the impact pressure on the partition 7. As such, starting from the original installed position, which is essentially depicted in FIG. 1, the partition 7 is configured to move out of its locking bead 18, and into the inner tube 1. The partition 7, as a result of the hydraulic pressure in the second fluid chamber 9 and accompanied by the operation of a conical deformation segment 19, is configured to deform a portion 12 of the inner tube 1, with an accompanying increase in the diameter of the portion 12 of the inner tube 1 during the movement of the partition 7 into the inner tube 1. The partition 7 can essentially move from its initial position along the tube 1 over the length of the deformation portion 12. In at least one embodiment of the present invention,-this deformation portion 12 could preferably be about one-half of the length of the cylinder 1.

To prevent energy peaks, which can result in damage to parts of the vehicle body, the inner tube can preferably be made of aluminum in at least the deformation portion thereof. So that the partition 7 does not become skewed during this movement process, the partition 7 can preferably be designed to have two guide segments 20 for guiding the movement of the partition 7, in an essentially non-twisting manner, within the inner tube 1. In alternative embodiments of the present invention, it may not be essential that a conical deformation segment 19 be provided on the partition 7. That is, any contour which generates a continuous deformation energy which remains essentially constant over a rather long absorption path above a certain energy level, could essentially be used. Any such contour would essentially have a wedge-shape for pushing the walls 12 outwardly.

If the impact-absorbing shock absorber survives the collision, for example, if the outer tube 10, or non-deformation portion of the inner tube 1 are not punctured or damaged, the partition 7 can essentially move back into its initial position because of the pressure exerted by the gas cushion. Consequently, the overall length of the impact-absorbing shock absorber, in its non-collision state, can essentially remain the same.

Because of the above-described configuration, impact absorbers can essentially be configured with various damping energies. The damping energy which is to be reduced by the deformation of the inner tube 1 is essentially determined by the difference in the diameters of the outer tube 10 and the inner tube 1, by the conical angle of the deformation segment 19, or by the wall thickness of the inner tube 1, e.g. of a design deformation portion 12. Thus, to provide dampers with different damping characteristics, at least one, or all of the above relationships can preferably be altered.

In order to provide an appropriate damping, or throttling action, in at least one embodiment of the present invention, the throttle opening 8 can preferably have a first diameter, at the chamber 6 side thereof, which can be about 1/7 to about ⅛ of the inside diameter of the inner tube 1. At the other side of the throttle opening 8, the chamber 9 side thereof, there could be a second diameter of preferably between about ⅜ to about ½ of the inside diameter of the inner tube 1. Alternatively, in other embodiments of the present invention, to provide harder or softer damping characteristics, the above ratios could be larger or smaller, or for example, 1/6 to about 1/9 for the first diameter on the chamber 6 side, and ¼ to about ⅜ for the second diameter on the chamber 9 side. Using the dimensions listed above, the throttle opening could have a first diameter which is about 3/13 to 4/13 of the second diameter.

To provide an appropriate wedging effect for expanding the sides 12, the deformation segment 19 of the partition 7, in at least one embodiment of the present invention can preferably have an angle of about 30° with respect to the longitudinal dimension of the impact damper. Alternatively, other angles could also be provided on the partition 7, which angles could range from possibly about 20° to about 40°, and include any and all angles therebetween. It would generally be understood that, the smaller the angle, the less force would be needed to move the partition 7. The partition 7 can essentially have a length between the first and second ends thereof. The deformation segment 19 can preferably have a length which is about ½ of the length of the partition 7, while the guide segments 20, on the chamber 9 side of the deformation segment 19, can preferably have a length of about ⅓ of the length of the partition 7, and the other guide segment 20 on the chamber 6 side of the partition 7 can preferably have a length of about 1/6 of the length of the partition 7.

Also, in one embodiment of the invention, the diameter of the partition 7 on the chamber 6 side thereof could preferably be about 4/5 of the diameter of the partition 7 on the chamber 9 side thereof. This difference in diameters of the partition 7 can also essentially represent the difference in diameters between the inner tube 1 and the outer tube 10. As previously indicated, variations of this difference in diameters between the inner tube 1 and outer tube 10 can provide for variations of the damping ability of such an impact absorber, or in other words, if the deformation distance is greater, more force would need to be applied to the partition 7 to move the partition 7, than if the difference in diameters, or the deformation distance was less, as more metal would need to be deformed to allow for movement of the partition 7. Essentially all of the examples presented above in terms of proportions and dimensions are meant as exemplary only, and variations thereof would be well within the skill of the artisan.

One feature of the invention resides broadly in the impact-absorbing shock absorber with two telescoping tubes, in particular for motor vehicles, to decelerate a vehicle by means of hydraulic damping forces and pneumatic spring forces when the vehicle collides with an obstacle, comprising an inner tube closed by a bottom, a gas chamber adjacent to the bottom and containing a gas cushion at high pressure, a separating piston guided so that it slides in a sealed manner inside the inner tube, a first fluid chamber, a partition fastened in the inner tube and provided with throttle openings, and a second fluid chamber which is connected by means of the partition to the first fluid chamber, characterized by the fact that above a defined energy absorption threshold, the partition 7 is displaced from its original installed position toward the gas chamber 3, with an accompanying change in the shape of the inner tube 1.

Another feature of the invention resides broadly in the impact-absorbing shock absorber characterized by the fact that the partition 7 has two guide segments 20 which are separated by a deformation segment 19.

Yet another feature of the invention resides broadly in the impact-absorbing shock absorber characterized by the fact that on the deformation segment 19, the partition 7 has a conical contour.

Still another feature of the invention resides broadly in the impact-absorbing shock absorber characterized by the fact that the energy absorption threshold can optionally be defined by means of the cone angle of the deformation segment, by the difference in the diameter of the two guide segments 20, and by means of the wall thickness of the inner tube 1.

A further feature of the invention resides broadly in the impact-absorbing shock absorber characterized by the fact that the inner tube 1 has a design deformation portion 12 which is made at least partly of aluminum.

Another feature of the invention resides broadly in the impact-absorbing shock absorber characterized by the fact that the maximum deformation distance is determined by the distance between the end 17 of the inner tube 1 and the closure of the outer tube 10 or by the distance between the initial position of the partition 7 and the gasket 11.

Yet another feature of the invention resides broadly in the impact-absorbing shock absorber characterized by the fact that after surviving a collision, the partition 7 can be pushed back into its initial position by the high pressure in the gas chamber 3.

Some additional examples of impact absorbers and the components thereof which could be used in conjunction with at least one embodiment of the present invention are disclosed by the following U.S. Pat. Nos.: U.S. Pat. No. 4,988,081 to Dohrmann, entitled "Impact Damper for a Motor Vehicle"; U.S. Pat. No. 5,242,157 to Bonenberger, Kirchner and Wagner, entitled "Impact Damper"; and U.S. Pat. No. 5,285,877 to Bonenberger, Kirchner and Wagner, entitled "Impact Damper".

All, or substantially all, of the components and methods of the various embodiments may be used with at least one embodiment or all of the embodiments, if any, described herein.

All of, the patents, patent applications and publications recited herein, and in the Declaration attached hereto, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. An impact damper for being connected between a frame and a bumper of a motor vehicle to dampen the impact of a collision of the motor vehicle with an obstacle, said impact damper comprising:

an outer tubular member for being attached to one of:
the frame of a motor vehicle, and
the bumper of a motor vehicle;
said outer tubular member having a first end and a second end;
said outer tubular member comprising a first chamber disposed adjacent the second end of said outer tubular member, said first chamber comprising a hydraulic fluid therein;
an inner tubular member for being attached to the other of:
the frame of a motor vehicle, and
the bumper of a motor vehicle;
said inner tubular member being at least partially disposed within said outer tubular member through the first end of said outer tubular member, said inner tubular member being axially movable within said outer tubular member;
said inner tubular member defining a longitudinal axis and said inner tubular member having a first end disposed towards said second end of said outer tubular member, a second end opposite the first end, and at least a portion of said inner tubular member defining a first dimension, said first dimension being substantially transverse to said longitudinal axis;
said inner tubular member comprising:
a second chamber disposed adjacent said second end of said inner tubular member, said second chamber comprising a reversibly compressible substance therein;
a third chamber disposed adjacent said second chamber;
piston means disposed between and separating said second chamber from said third chamber;
separating means disposed adjacent said at least a portion of said inner tubular member for separating said first chamber from said third chamber, said separating means having an opening therethrough for passage of fluid between said first and third chambers, said opening comprising damping means for damping passage of fluid therethrough, said separating means having a second dimension disposed substantially parallel to the first dimension of said at least a portion of said inner tubular member, said second dimension being substantially greater than said first dimension;
means for retaining said separating means in an initial position between said at least a portion of said inner tubular member and said first chamber;
said separating means being configured for moving along said at least a portion of said inner tubular member under a force applied to said separating means by the fluid in said first chamber to absorb impact energy of a collision; and
said separating means comprising means for expanding said at least a portion of said inner tubular member during movement along said at least a portion of said inner tubular member, said means for expanding comprising means for increasing said at least a portion of said inner tubular member from said first dimension to substantially said second dimension.

2. The impact damper according to claim 1, wherein:
said reversibly compressible substance comprises a gas under pressure;
said damping means being configured for passage of fluid therethrough to expand said second chamber and compress said gas at impact forces up to a predetermined range of impact forces; and
said at least a portion of said inner tubular member and said separating means being configured for movement of said separating means along said at least a portion of said inner tubular member and expanding said at least a portion of said inner tubular member at impact forces greater than said predetermined range of impact forces.

3. The impact damper according to claim 2, wherein:
said inner tubular member has an interior surface, said interior surface of said at least a portion of said inner tubular member defines said first dimension;
said separating means comprises a peripheral surface disposed about said separating means adjacent said interior surface of said inner tubular member, at least a part of said peripheral surface of said separating means defines said second dimension; and
said peripheral surface comprises said means for expanding.

4. The impact damper according to claim 3, wherein:
said separating means comprises a first end disposed towards said third chamber and a second end disposed towards said first chamber, said separating means comprises a first portion disposed towards said first end, and a second portion disposed towards said second end, said first portion comprising said first dimension and said second portion comprising said second dimension;
said peripheral surface of said separating means comprises a peripheral surface portion between said first and second portions; and
said peripheral surface portion between said first and second portions, comprises said means for expanding said at least a portion of said inner tubular member during movement of said separating means along said at least a portion of said inner tubular member.

5. The impact damper according to claim 4, wherein said at least a portion of said inner tubular member comprises aluminum.

6. The impact damper according to claim 5, wherein:
said first and second portions of said separating means respectively comprise first and second cylindrical surfaces;
said first cylindrical surface having an outside diameter of said first dimension;
said second cylindrical surface having an outside diameter of said second dimension; and
said first and second cylindrical surfaces comprising guide surfaces for guiding movement of said separating means within said inner tubular member in a non-twisting manner.

7. The impact damper according to claim 6, wherein said peripheral surface portion between said first and second portions comprises a conical portion, said conical portion defining a conical surface; and said damping means in said opening of said separating means comprises a throttle opening for throttling fluid flow from said first chamber into said third chamber.

8. The impact damper according to claim 7, wherein:

said conical surface between said first and second portions of said separating means defines a cone angle with respect to the longitudinal axis of said inner tubular member;

said at least a portion of said inner tubular member has a wall thickness;

said first and second dimensions define a difference therebetween; and said impact damper has an energy absorption threshold, said energy-absorption threshold being dependent on:

said cone angle, with greater cone angles increasing said energy absorption threshold;

said wall thickness, with greater wall thickness increasing said energy absorption threshold; and said differences in dimensions, with greater difference increasing said energy absorption threshold.

9. The impact damper according to claim 8, wherein:

said inner tubular member comprises a sealing member disposed thereabout for sealing between said inner tubular member and said outer tubular member, said sealing member being spaced apart from said first end of said inner tubular member, said sealing member being held in a substantially fixed position on said inner tubular member;

said initial position of said separating means is within said inner tubular member substantially adjacent said first end of said inner tubular member;

said impact damper defines a first distance between said sealing member and said initial position of said separating means;

said at least a portion of said inner tubular member extending from said first end of said inner tubular member to approximately said sealing member;

said first distance defining a maximum deformation distance for expansion of said at least a portion of said inner tubular member by said separating means; and said separating means is movable back into said initial position by a pressure exerted on said first end of said separating means by the compressed pressurized gas.

10. The impact damper according to claim 9, wherein:

said throttle opening has a first diameter at said first end of said separating means, and a second diameter at said second end of said separating means;

said first diameter being about 3/13 to about 4/13 of said second diameter;

said first dimension is about 4/5 of said second dimension;

said cone angle is about 30°;

said first diameter of said throttle opening is about 1/7 to about 1/8 of said first dimension;

said second diameter of said throttle opening is about 3/8 to about 1/2 of said first dimension;

said inner tubular member comprises means for attaching said inner tubular member to a bumper of a motor vehicle; said outer tubular member comprises means for attaching said outer tubular member to a frame of the motor vehicle;

said inner tubular member has a length, said first distance being about 1/2 the length of said inner tubular member;

said inner tubular member comprises notch means for retaining said sealing member in a substantially fixed position on said inner tubular member;

said sealing member comprising means for engaging said notch means;

said first end of said inner tubular member is bent inwardly to form flange means for retaining said separating means in said inner tubular member;

said separating means has a length between said first and second ends thereof;

said second portion of said separating means comprises said second end of said separating means, said second portion comprising about 1/3 of the length of said separating means;

said first portion of said separating means comprises said first end of said separating means, said first portion comprising about 1/6 of the length of said separating means; and said conical portion comprises about 1/2 of the length of said separating means.

11. An impact damper for being connected between a frame and a bumper of a motor vehicle to dampen the impact of a collision of the motor vehicle with an obstacle, said impact damper comprising:

an outer tubular member;

means for operatively attaching said outer tubular member to one of:
the frame of a motor vehicle, and
the bumper of a motor vehicle;

said outer tubular member having a first end and a second end;

said outer tubular member comprising a first chamber disposed adjacent the second end of said outer tubular member, said first chamber comprising a hydraulic fluid therein;

an inner tubular member;

said inner tubular member comprising means for operatively attaching said inner tubular member to the other of:
the frame of a motor vehicle, and
the bumper of a motor vehicle;

said inner tubular member being at least partially disposed within said outer tubular member through the first end of said outer tubular member, said inner tubular member being axially movable within said outer tubular member;

said inner tubular member having a longitudinal axis, a first end disposed towards said second end of said outer tubular member, a second end opposite the first end, and at least a portion of said inner tubular member defining a first dimension, said first dimension being disposed substantially transverse to said longitudinal axis;

said inner tubular member comprising:
second chamber means disposed within said inner tubular member;
separating means disposed adjacent said at least a portion of said inner tubular member for separating said first chamber from said second chamber means, said separating means having a second dimension, said second dimension being disposed substantially parallel with the first dimension of said at least a portion of said inner tubular member, said second dimension being substantially greater than said first dimension;

means for retaining said separating means in an initial position between said at least a portion of said inner tubular member and said first chamber;

said separating means being configured for moving along said at least a portion of said inner tubular member under a force applied to said separating means by the fluid in said first chamber; and said separating means comprising means for expanding said at least a portion of said inner tubular member during movement along said at least a portion of said inner tubular member, said means for expanding comprising means for increasing said at least a portion of said inner tubular member from said first dimension to substantially said second dimension.

12. The impact damper according to claim 11, wherein:

said inner tubular member has an interior surface, said interior surface defining said first dimension;

said separating means comprises guide means for guiding movement of said separating means along said interior surface of said inner tubular manner in a non-twisting manner;

said separating means comprises a peripheral surface disposed about said separating means adjacent said interior surface of said inner tubular member, at least a portion of said peripheral surface comprising said second dimension; and said peripheral surface comprises said means for expanding.

13. The impact damper according to claim 12, wherein:

said separating means comprises a first end disposed towards said second chamber means and a second end disposed towards said first chamber, said separating means comprises a first portion disposed towards said first end, and a second portion disposed towards said second end, said first portion comprising said first dimension and said second portion comprising said second dimension;

said peripheral surface of said separating means, between said first and second portions, comprises said means for expanding said at least a portion of said inner tubular member during movement of said separating means along said at least a portion of said inner tubular member.

14. The impact damper according to claim 13, wherein:

said peripheral surface between said first and second portions has a conical contour;

said second chamber means comprises a first chamber portion disposed adjacent said second end of said inner tubular member, said first chamber portion comprising a reversibly compressible material therein for being compressed during impact to absorb at least a portion of the impact energy.

15. The impact damper according to claim 14, wherein: said second chamber means comprises:

a second chamber portion disposed between said first chamber portion and said separating means, said second chamber portion comprising hydraulic fluid therein; and piston means movably disposed between and separating said first chamber portion from said second chamber portion;

said separating means comprises a fluid passage therethrough for fluidly connecting said first chamber with said second chamber portion of said second chamber means; and said fluid passage comprises damping means for damping passage of fluid from said first chamber to said second chamber portion of said second chamber means.

16. The impact damper according to claim 15, wherein:

said compressible material comprises a gas under pressure;

said damping means being configured for passage of fluid therethrough to expand said second chamber portion and compress said gas at impact forces up to a predetermined range of impact forces; and said at least a portion of said inner tubular member and said separating means being configured for movement of said separating means along said at least a portion of said inner tubular member and expanding said at least a portion of said inner tubular member at impact forces greater than said predetermined range of impact forces.

17. The impact damper according to claim 16, wherein:

said first and second portions of said separating means respectively comprise first and second cylindrical surfaces, said first cylindrical surface having an outside diameter of said first dimension, and said second cylindrical surface having an outside diameter of said second dimension, said first and second cylindrical surfaces comprising guide surfaces for guiding movement of said separating means within said inner tubular member; and said at least a portion of said inner tubular member comprises aluminum.

18. The impact damper according to claim 17, wherein:

said conical contour between said first and second portions of said separating means defines a cone angle with respect to the longitudinal axis of said inner tubular member;

said at least a portion of said inner tubular member has a wall thickness;

said first and second dimensions define a difference therebetween; and said impact damper has an energy absorption threshold, said energy absorption threshold being dependent on:

said cone angle, with greater cone angles increasing said energy absorption threshold;

said wall thickness, with greater wall thickness increasing said energy absorption threshold; and said differences in dimensions, with greater difference increasing said energy absorption threshold.

19. The impact damper according to claim 18, wherein:

said inner tubular member comprises a sealing member disposed thereabout for sealing between said inner tubular member and said outer tubular member, said sealing member being spaced apart from said first end of said inner tubular member, said sealing member being held in a substantially fixed position on said inner tubular member;

said initial position of said separating means is within said inner tubular member substantially adjacent said first end of said inner tubular member;

said impact damper defines a first distance between said sealing member and said initial position of said separating means;

said at least a portion of said-inner tubular member extends from said first end of said inner tubular member to approximately said sealing means;

said first distance defines a maximum deformation distance for expansion of said at least a portion of said inner tubular member by said separating means; and said separating means is movable back into said initial position by a pressure exerted on said first end of said separating means by the compressed pressurized gas.

20. The impact damper according to claim 19, wherein:

said damping means in said fluid passage comprises a throttle opening;

said throttle opening having a first diameter at said first end of said separating means, and a second diameter at said second end of said separating means;

said first diameter being about 3/13 to about 4/13 of said second diameter;

said first dimension is about 4/5 of said second dimension;

said cone angle is about 30°;

said first diameter of said throttle opening is about 1/7 to about ⅛ of said first dimension;

said second diameter of said throttle opening is about ⅜ to about ½ of said first dimension;

said inner tubular member has a length, said first distance being about ½ the length of said inner tubular member;

said inner tubular member comprises notch means for retaining said sealing member in a substantially fixed position on said inner tubular member;

said sealing member comprising means for engaging said notch means;

said first end of said inner tubular member is bent inwardly to form flange means for retaining said separating means in said inner tubular member;

said separating means has a length between said first end and said second end thereof;

said second portion of said separating means comprises said second end of said separating means, said second portion comprising about ⅓ of the length of said separating means;

said first portion of said separating means comprises said first end of said separating means, said first portion comprising about 1/6 of the length of said separating means; and said conical portion comprises about ½ of the length of said separating means.

* * * * *